United States Patent
Lundell et al.

(10) Patent No.: US 11,852,824 B2
(45) Date of Patent: Dec. 26, 2023

(54) EYE-IMAGING SYSTEM WITH SWITCHABLE HOT MIRRORS

(71) Applicant: Microsoft Technology Licensing, LLC, Redmond, WA (US)

(72) Inventors: Benjamin Eliot Lundell, Seattle, WA (US); Joel Steven Kollin, Seattle, WA (US); Ishan Chatterjee, Mountain View, CA (US); Maria Esther Pace, Palo Alto, CA (US); Mark Theodore Bolas, Bellevue, WA (US); Bernard Charles Kress, Redwood City, CA (US); Robert Thomas Held, Seattle, WA (US); Andreas Georgiou, Cambridge (GB); Christopher Charles Aholt, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/657,883

(22) Filed: Apr. 4, 2022

(65) Prior Publication Data

US 2023/0314803 A1 Oct. 5, 2023

(51) Int. Cl.
*G02B 27/01* (2006.01)
*G02B 26/08* (2006.01)
*G06V 40/19* (2022.01)
*G06T 7/70* (2017.01)

(52) U.S. Cl.
CPC ..... *G02B 27/0172* (2013.01); *G02B 26/0816* (2013.01); *G06T 7/70* (2017.01); *G06V 40/19* (2022.01); *G02B 2027/0138* (2013.01)

(58) Field of Classification Search
CPC .......... B29C 45/0001; B29C 45/14778; B29C 45/1615; B29C 45/1671; B29C 2045/14139; B29D 11/00009; B29D 11/00596; B29D 11/00634; B29D 11/0073; G02B 27/0093; G02B 27/0172; B29K 2033/12; B29K 2067/003; B29K 2069/00; B29K 2995/0018; B29K 2995/0026; B29K 2995/003; B29L 2011/00; B29L 2011/0058
See application file for complete search history.

(56) References Cited

U.S. PATENT DOCUMENTS

| | | |
|---|---|---|
| 10,168,531 B1 | 1/2019 | Trail et al. |
| 10,698,204 B1 | 6/2020 | Ouderkirk et al. |
| 10,852,544 B1 | 12/2020 | Zhang et al. |

(Continued)

OTHER PUBLICATIONS

"International Search Report and Written Opinion issued in PCT Application No. PCT/US2023/011376", dated May 12, 2023, 10 Pages.

*Primary Examiner* — Nelson M Rosario
(74) *Attorney, Agent, or Firm* — Alleman Hall Creasman & Tuttle LLP

(57) ABSTRACT

Examples are disclosed that relate to using an array of hot mirrors in an eye-imaging system. One example provides a head-mounted display system, comprising a frame, an eye-imaging camera supported on the frame, a switchable hot mirror array comprising a plurality of switchable hot mirrors configured to direct light reflecting from an eye toward the eye-imaging camera, and a controller configured to control switching of a reflectivity of each of the plurality of switchable hot mirrors.

20 Claims, 9 Drawing Sheets

(56) References Cited

U.S. PATENT DOCUMENTS

| | | | |
|---|---|---|---|
| 11,366,298 B1* | 6/2022 | Amirsolaimani | G02B 17/0856 |
| 2012/0050143 A1 | 3/2012 | Border et al. | |
| 2020/0074651 A1* | 3/2020 | Zhang | G02B 27/0179 |
| 2022/0274299 A1* | 9/2022 | Cohen | B29D 11/00634 |
| 2022/0350149 A1* | 11/2022 | Xu | G02B 27/0172 |

\* cited by examiner

EYE-IMAGING SYSTEM WITH SWITCHABLE HOT MIRRORS

BACKGROUND

Display devices may utilize eye-imaging cameras to enable eye tracking as an input mode and/or for user authentication. Eye tracking may enable a display device to respond to movements of a user's eye, such as by displaying virtual imagery in appropriate locations, and/or detecting eye gestures as user inputs. However, positioning eye-imaging cameras on some devices may pose challenges. For example, a head-mounted mixed-reality display device may comprise a see-through display that combines projected virtual imagery with a view of a real-world environment. In such a device, positioning an eye-imaging camera in front of a user's eye may occlude a view of the real-world environment. On the other hand, positioning the eye-imaging camera on a frame of the device may provide only an oblique view of the user's eye, thereby making eye tracking more challenging for some gaze directions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to using an array of hot mirrors in an eye-imaging system. One example provides a head-mounted display system comprising a frame, an eye-imaging camera supported on the frame, a switchable hot mirror array comprising a plurality of switchable hot mirrors configured to direct light reflecting from an eye toward the eye-imaging camera, and a controller configured to control switching of a reflectivity of each of the plurality of switchable hot mirrors.

DETAILED DESCRIPTION

Figure 1:
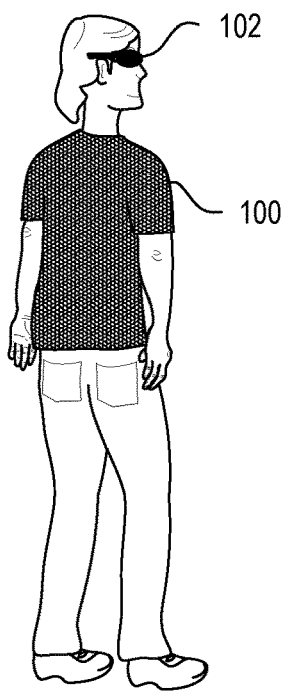
FIG. 1 shows a user wearing an example head-mounted display device comprising an eye-imaging camera.

As mentioned above, positioning eye-imaging cameras on some head-mounted devices may pose challenges. For example, some head-mounted mixed-reality display devices may position an optical combiner close to a user's eye to mix virtual projected images with a view of a real-world background. As such, a frame that supports the combiner (which may take the form of an eyeglasses frame in some examples) may be positioned at oblique angles to a user's eye. Thus, a camera positioned on such a frame may not have a clear view of the user's pupil when the user's gaze is directed away from the camera. As one possible solution to this problem, two or more cameras may be used for each eye to image the eye from different angles. While such an arrangement may provide for unobstructed imaging of the eye from a wider variety of angles, the use of multiple cameras increases device cost and complexity.

As another possible solution, a hot mirror may be placed in front of the eye to reflect infrared light toward a camera positioned obliquely to the eye. A hot mirror is a dichroic reflector that reflects one or more wavelengths of infrared light (which may include near-infrared) while being transparent to visible light. In such a configuration, the mirrors and the camera are not visible to the user, yet the image formed on the camera's image sensor may appear as though it originates from a camera directly in front of the user's eye. The hot mirror may be formed on a surface of a transparent substrate, or embedded within a transparent support. However, as the hot mirror would be angled relative to the eye (e.g. to reflect light upward or to the side toward a frame-mounted camera), to provide for a suitably wide field of view, the hot mirror may have a relatively thick profile in a dimension extending outward from a user's eye, as explained in more detail below. This may complicate the placement of an optical combiner, impact device design, and/or add to device weight.

Accordingly, examples are disclosed that relate to using a switchable hot mirror array in an eye-imaging system for a more compact design compared to a single hot mirror. Each switchable hot mirror may be arranged at an angle relative to the eye, and may direct a portion of an image of an eye toward an eye-imaging camera. When imaging the eye, each switchable hot mirror may be switched on for a period of time to direct a corresponding portion of an image to the camera, and then switched off to avoid blocking image portions reflected by switchable mirrors located farther from the camera. In some examples, the switchable hot mirrors may be turned on in a sequence (e.g. bottom to top, top to bottom, outside to inside, or inside to outside). The infrared light incident on the currently switched-on mirror is reflected toward the camera, and passes through the other hot mirrors along the path to the camera that are switched off. In various examples, the mirrors may be flat, or may be curved to provide optical power.

The term "switchable mirror" as used herein represents a mirror with a reflectivity that can be turned on and off by an electrical signal. A switchable mirror may comprise any suitable construction. In some examples, a switchable mirror may comprise a liquid crystal material controllable to selectively rotate a polarization of light, and a polarization-selective mirror. In other examples, a switchable mirror may be configured as a switchable Bragg grating. In such examples, the switchable mirror may comprise a liquid crystal material arranged in a periodic pattern that can be controlled to switch between a diffractive state in which the liquid crystal material forms a periodic array of varying refractive indices, and an indexed-matched state. In yet other examples, any other suitable switchable reflective structure may be used.

Switchable hot mirrors provide the advantage of a more compact design compared to traditional hot mirror systems. By arranging several smaller, switchable mirrors in an array, the size of the display device may be reduced without sacrificing camera field of view compared to the use of a single hot mirror. As such, the disclosed eye-imaging systems may enable more compact form factors for head mounted devices, while imaging the eye at a front-view angle.

FIG. 1 shows a user 100 wearing an example head-mounted display device 102 in the form of eyeglasses comprising one or more eye-imaging cameras. The term "eye-imaging camera" is used herein to encompass eye tracking (gaze tracking) cameras, iris recognition cameras, and/or any other camera configured to image an eye of a user of a head-mounted or near-eye device. Head-mounted display device 102 may be configured to present augmented reality (e.g. mixed reality) and/or virtual reality imagery to user 100. The eye-imaging cameras on head-mounted display device 102 may be used for gaze tracking and eye positioning for accurate display of imagery or for detecting user gaze inputs, and user identification/authentication via iris recognition, among other uses.

Figure 2:
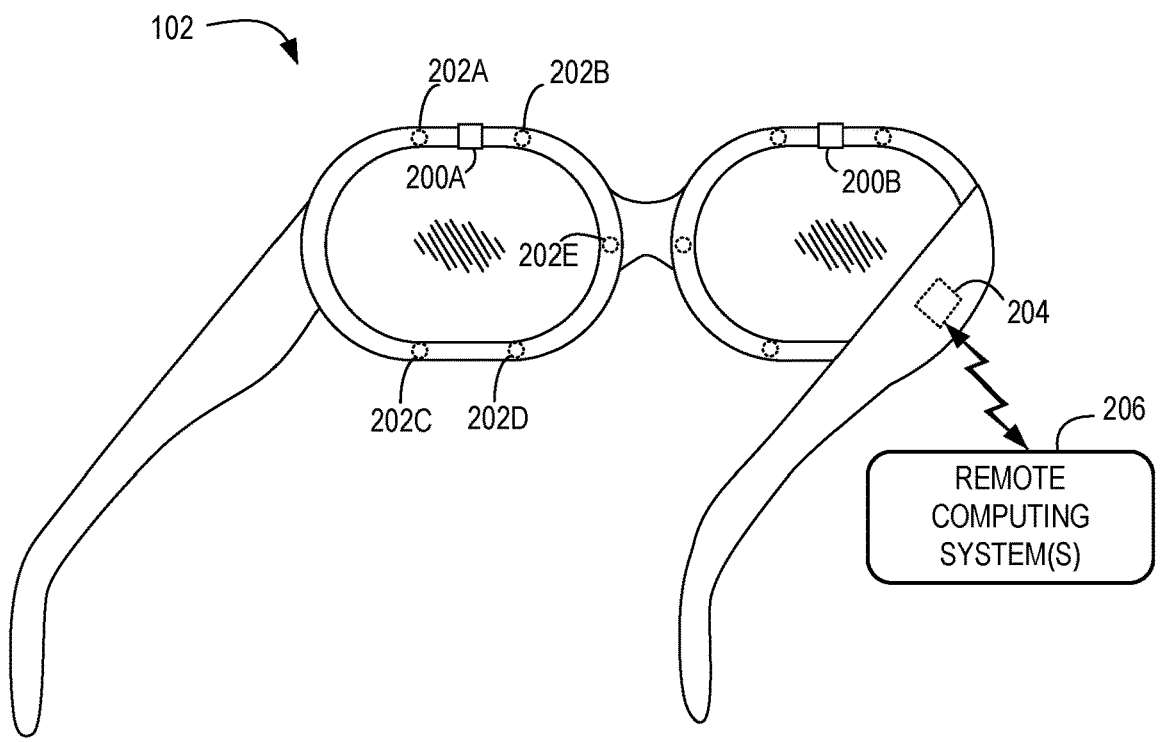
FIG. 2 shows the head-mounted display device of FIG. 1 in more detail.

FIG. 2 schematically shows head-mounted display device 102 in more detail. Head-mounted display device 102 includes eye-imaging cameras 200A, 200B and a plurality of illumination (e.g. glint) sources for each eye-imaging camera 200A, 200B. Each eye-imaging camera 200A, 200B may be used to determine a gaze direction of an eye of a user. Four glint light sources are illustrated for eye-imaging camera 200A at 202A, 202B, 202C, and 202D. Eye-imaging camera 200B may have a similar arrangement of glint light sources. Each glint light source 202A-D is configured to direct light (e.g. infrared light) toward a cornea of an eye. Image data from each eye-imaging camera 200A, 200B is analyzed to determine the locations of reflections ("glints") from glint light sources 202A-D and a location of the pupil of the eye. The reflection and pupil location data may then be used to determine a gaze direction, in combination with anatomical models related, for example, to eye geometry and/or head geometry. In the depicted example, the glint light source(s) 202A-D are positioned to be above and below an eye of a user, and the eye-imaging cameras 200A, 200B are positioned at an upper portion of the frame. In other examples, eye-imaging cameras and glint light sources may be positioned in any other suitable locations on head-mounted display device 102. In further examples, one or more flood light sources may be utilized in addition to or alternatively to glint light sources 202A-D. As described in more detail below, a hot mirror array may be utilized to direct light from such a flood light source toward the eye, e.g. for bright pupil eye tracking and/or iris recognition. Head-mounted display device 102 may include any other suitable components not shown, such as near-eye displays, outward-facing cameras, face-tracking cameras, head-tracking cameras, acoustic sensors, motions sensors, and other input and output devices.

Head-mounted display device 102 further comprises a controller 208. Controller 208 comprises, among other components, a logic subsystem comprising a processor, and a storage subsystem comprising one or more storage devices. The storage subsystem stores instructions executable by the logic subsystem to control the various functions of head-mounted display device 102, examples of which are described in more detail below. Head-mounted display device 102 further may comprise a communication subsystem for communicating via a network with one or more remote computing system(s) 206. For example, image data acquired by cameras 200A, 200B may be sent to remote computing system(s) 210 for processing in some examples.

Figure 3:
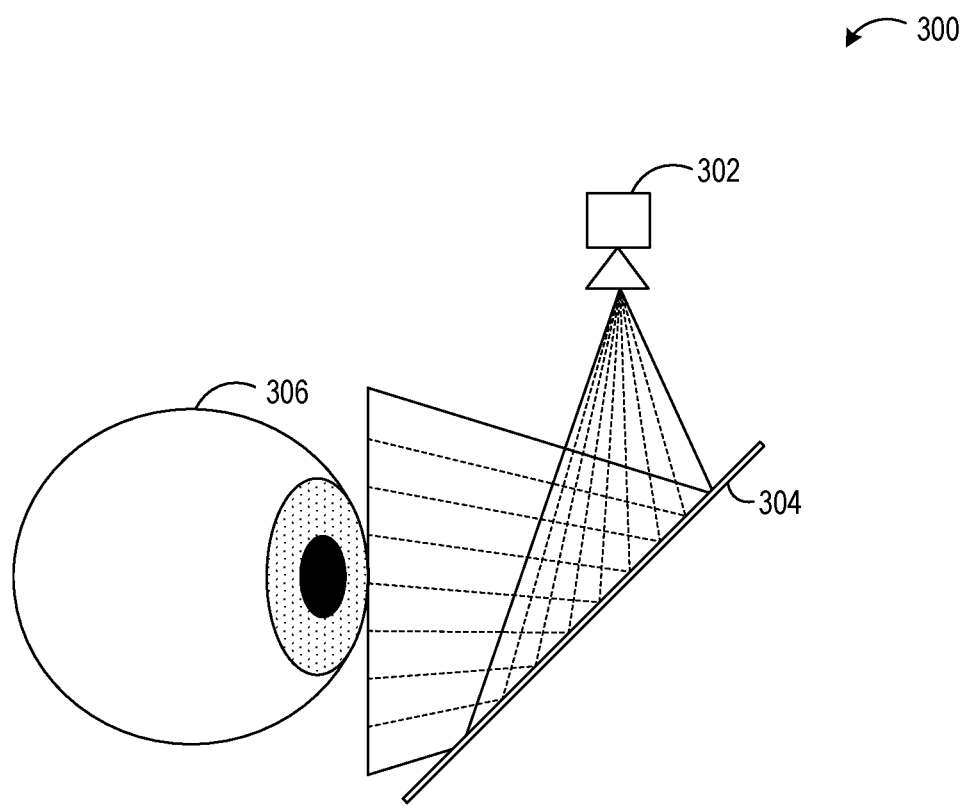
FIG. 3 schematically shows an example eye-imaging system comprising a single hot mirror.

As mentioned above, the use of a single hot mirror, rather than a hot mirror array, in an eye-imaging system may result in a bulky device due to the space occupied by the hot mirror. FIG. 3 schematically shows an example eye-imaging system 300 comprising an eye-imaging camera 302, which may be frame-mounted, and a hot mirror 304 imaging an eye 306. FIG. 3 may represent a top view or a side view of eye 306, such that hot mirror 304 is angled relative to eye 306 to reflect light toward eye-imaging camera 302. In FIG. 3 and other figures shown herein, the illustrated components are shown schematically and are not to scale.

As shown, hot mirror 304 may have a significant depth in a dimension outward from eye 306. This is to provide a sufficient field of view to ensure that eye-imaging system 300 can fully image eyes of a population of users with different face geometries, and eyes in range of eye positions. However, in view of the size of hot mirror 304, eye-imaging system 300 may be hard to fit onto a device with a small form factor, such as eyeglasses and other head-mounted devices.

In contrast, FIGS. 4A-4D show an example eye-imaging system 400 comprising an array 405 of switchable hot mirrors imaging an eye 402. Eye-imaging system 400 includes an eye-imaging camera 404, switchable hot mirror array 405 comprising switchable hot mirrors 406, 408, 410, and 412, and controller 414 configured to control reflectivity of switchable hot mirrors 406, 408, 410, 412 and operate eye-imaging camera 404. Switchable hot mirrors 406, 408, 410, 412 are shown as being arranged in a visibly transparent support 416. In other examples, switchable hot mirrors 406, 408, 410, 412 may have any other suitable arrangement. For example, an array of switchable hot mirrors may be formed on a surface of a visibly transparent Fresnel prism array. As another example, an array of switchable hot mirrors may be arranged in free space, such that each switchable hot mirror is located on a thin substrate that is separated from other hot mirrors by an air gap.

FIGS. 4A-4D may represent a top view or a side view of eye 402, such that switchable hot mirrors 406, 408, 410, 412 are reflecting light upward or to the side toward eye-imaging camera 404. It will be understood that a switchable hot mirror array may be arranged along any suitable direction. Eye-imaging camera 404, controller 408, and visibly transparent support 418 are omitted in FIGS. 4B-4D. Although shown here with four switchable hot mirrors, it will be understood that any other suitable number of hot mirrors may be utilized. Further, the switchable hot mirrors of the array 405 are illustrated as being controllable along one dimension. In other examples, a switchable hot mirror array may be controllable along two or three dimensions.

Figure 4A:
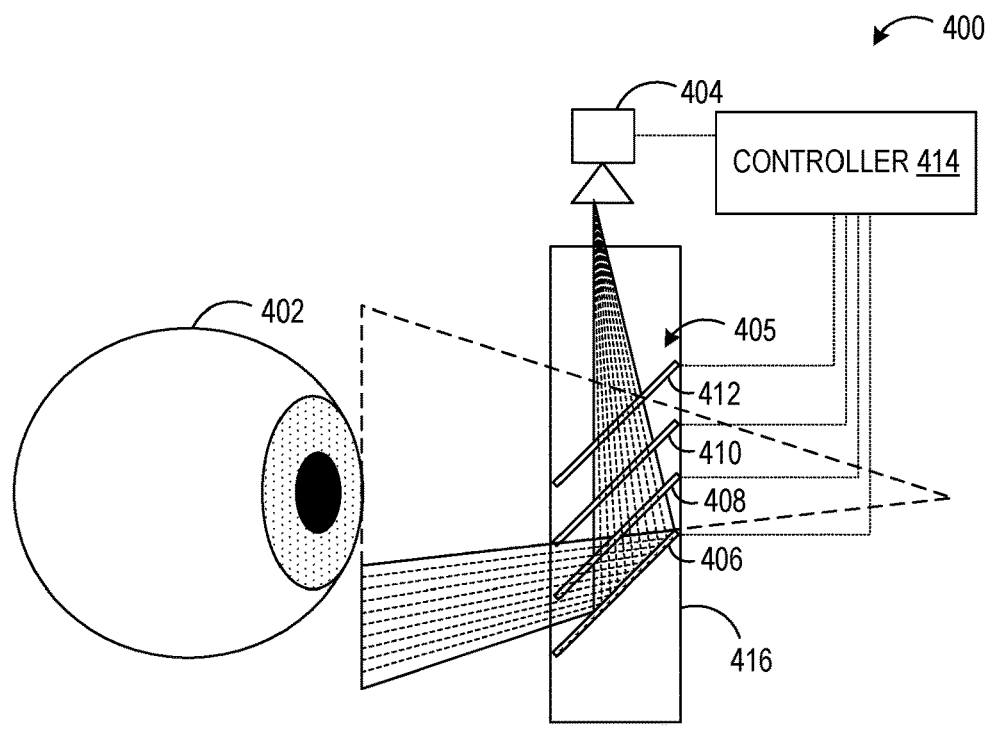
FIGS. 4A-4D schematically show operation of an example eye-imaging system comprising an array of switchable hot mirrors.
Figure 4B:
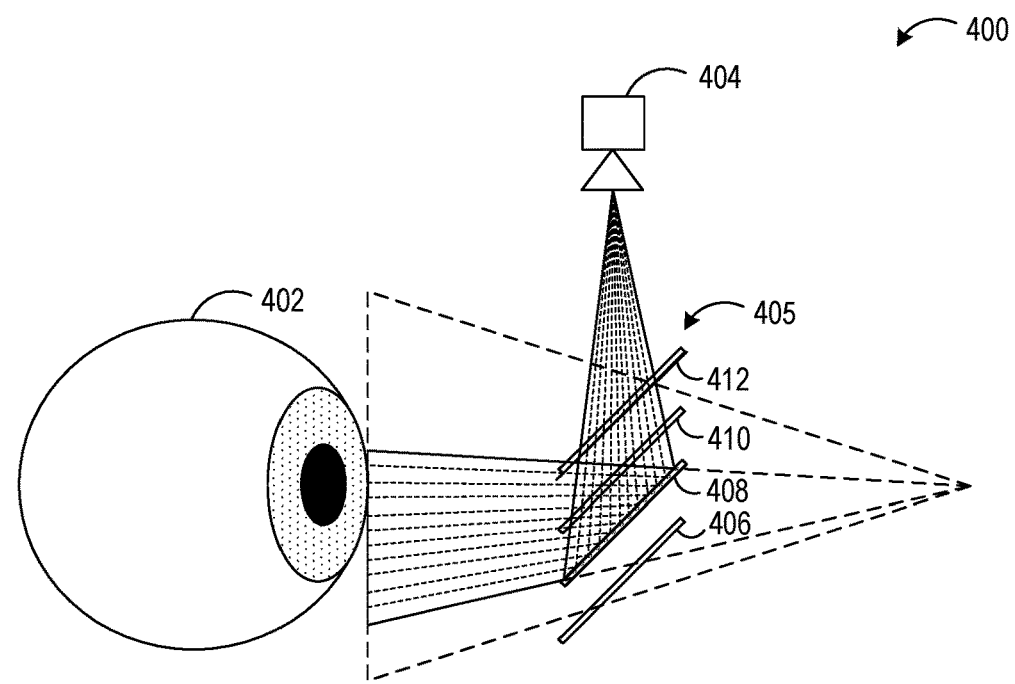
Figure 4C:
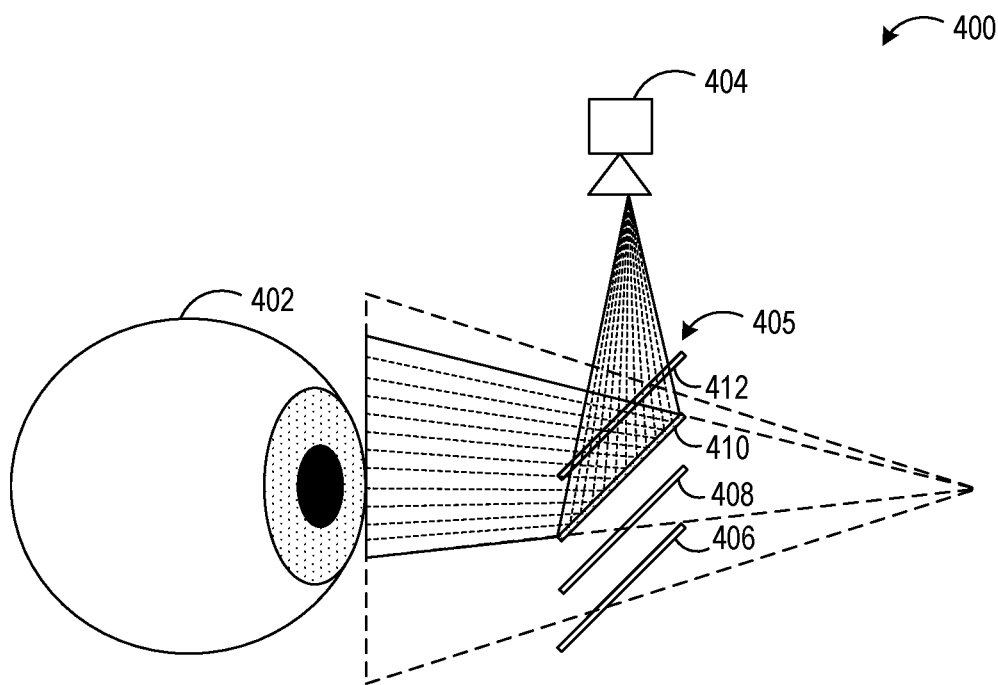
Figure 4D:
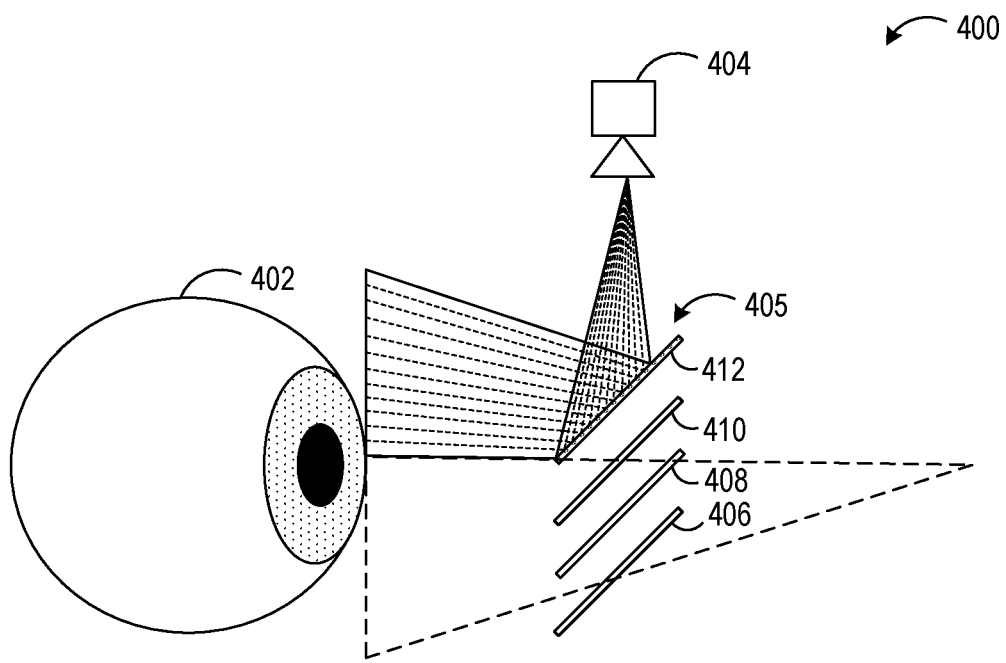

FIG. 4A shows switchable hot mirror 406 switched on to reflect infrared light (as provided by illumination sources, such as glint sources), toward eye-imaging camera 404, while switchable hot mirrors 408, 410, and 412 are off to allow infrared light to pass through. FIG. 4B shows switchable hot mirror 408 switched on to reflect infrared light toward eye-imaging camera 404, while switchable hot mirrors 410 and 412 are off. Switchable hot mirror 406 may be off or on in this configuration. Next, FIG. 4C shows switchable hot mirror 410 switched on, while switchable hot mirror 412 is off. Switchable hot mirrors 406 and 408 may be on or off in this configuration. FIG. 4D shows switchable hot mirror 412 switched on, while switchable hot mirrors 406, 408, and 410 are on or off. This pattern may be repeated to capture additional frames of eye-imaging data.

In some examples, switchable hot mirrors 406, 408, 410, 412 may be configured to be actively driven both to a reflective state and to a transmissive state. Driving the mirror switching in both directions may provide for faster switching times. In other examples, switchable hot mirrors 406, 408, 410, 412 may be driven in one direction and allowed to relax passively in another direction. Such operation may be lower power, but relaxation times may be longer than driven switching times. In such examples, switchable hot mirrors 406, 408, 410, 412 may be configured such that relaxation occurs within an exposure time of eye-imaging camera 404 for a frame of eye-imaging data.

In FIGS. 4A-4D, switchable hot mirrors 406, 408, 410, 412 are shown as being switched on starting with a switchable hot mirror farthest from eye-imaging camera 404, and sequentially switching each next-closest mirror to eye-imaging camera 404. In other examples, the switchable hot mirrors may be switched on in any other suitable sequence. In some examples, more than one hot mirror may be switched on at a time. In some examples, the switching may be synchronized with a rolling-shutter camera. In such examples, the pixels of the rolling-shutter camera that are illuminated by one or more currently switched-on mirror(s) are integrated, while other pixels are not integrated. Eye-imaging may be performed at any suitable frame rate, including frame rates within a range of 30 to 120 Hz in some examples.

In some examples, images of a portion of an eye, rather than an entire eye, may be captured in at least some imaging frames. For example, it may be desired to image a user's eye in a vicinity of a pupil and iris, and not other regions of the eye. In such examples, eye tracking data may be used to determine a pupil location, and a subset of one or more switchable hot mirrors 406, 408, 410, 412 may be controlled to image the pupil, while not imaging other parts of the eye. This may provide power saving by switching only a subset of switchable hot mirrors 406, 408, 410, 412 in some imaging frames. In such examples, eye imaging may be steered based on a continuously updated pupil position by switching on the appropriate switchable hot mirrors based upon pupil position. Likewise, in some examples, a subset of one or more of switchable hot mirrors 406, 408, 410, 412 may be controlled to stay on for longer or shorter times compared to others, rather than being controlled to be on a same duration.

Similarly, a most recently-determined pupil position may be used to determine a subset of pixels of eye-imaging camera 404 to read. This may provide power saving by reading a subset of camera pixels, rather than all pixels, for an eye image data frame.

As the optical path length of each switchable hot mirror may be different, some blur may be experienced at eye-imaging camera 404, depending upon a lens system and aperture used by eye-imaging camera 404. Thus, as mentioned above, in some examples, one or more of switchable hot mirrors 406, 408, 410, 412 may have optical power, for example by having a curved shape. The optical powers of each switchable hot mirror 406, 408, 410, 412 may be configured to mitigate such blurring effects. This may allow omission of a lens in eye-imaging camera 404 in some examples. Additionally or alternatively, eye-imaging camera 404 may have a small aperture with a high depth of field to avoid blurry images. In yet other examples, eye-imaging camera 404 may comprise an auto-focus lens system, such that a focus may be changed from mirror to mirror.

Figure 5A:
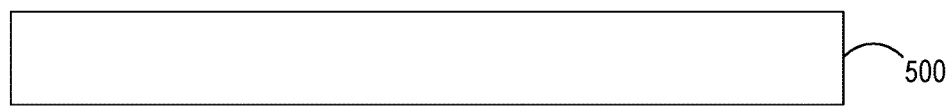
FIGS. 5A-5D schematically illustrate an example method of making a switchable hot mirror array.
Figure 5B:
Figure 5C:
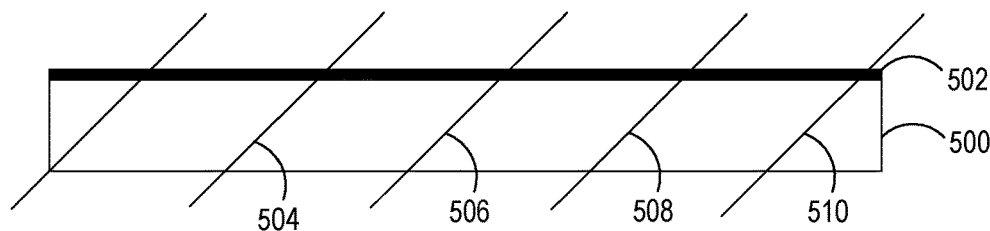
Figure 5D:
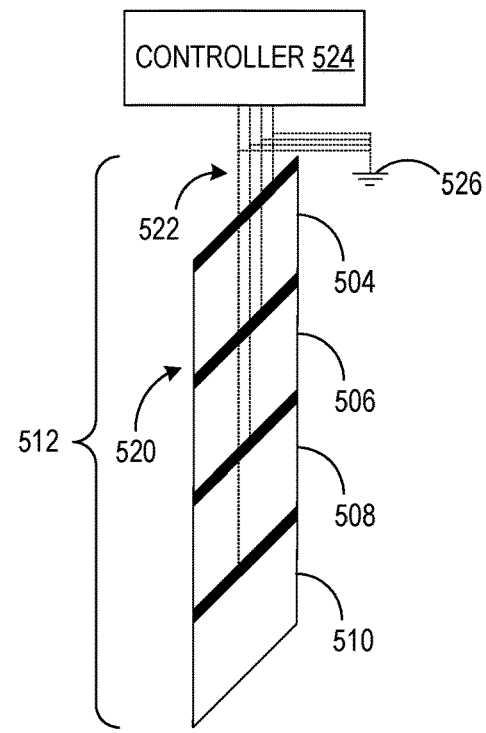

As mentioned above, in some examples, switchable hot mirrors 406, 408, 410, 412 may be arranged within a visibly transparent support. FIGS. 5A-5D schematically illustrate an example process for manufacturing such a switchable hot mirror array. First, FIG. 5A shows a visibly transparent substrate 500. As examples, substrate 500 may be made of a suitable plastic or glass that is sufficiently transparent to visible and infrared wavelengths of interest for desired imaging performance. Next, FIG. 5B shows a switchable hot mirror structure 502 applied to a top of substrate 500. Switchable hot mirror structure 502 may include various electrode layers, dielectric layers, and liquid crystal layers, among others. Next, FIG. 5C shows diagonal cuts made through substrate 500 comprising hot mirror structure 502, thereby forming a plurality of cut portions 504, 506, 508 and 510 each comprising a hot mirror segment. Next, FIG. 5D shows cut portions 504, 506, 508 and 510 stacked and joined together to form visibly transparent support 512 comprising an embedded switchable hot mirror array 520. FIG. 5D also schematically shows electrical traces 522 connected to each switchable hot mirror of hot mirror array 520. Electrical traces 522 connect electrode layers of each switchable hot mirror to a controller 524, and to ground at 526. Electrical traces 522 may be formed from any suitable material. Examples include, but are not limited to, transparent conductive oxides, such as indium tin oxide and fluoride-doped tin oxide.

As another example manufacturing process, an embedded switchable hot mirror array visibly transparent support may be formed by molding (e.g. injection molding) individual substrate segments, forming a hot mirror structure on a surface of each substrate segment, stacking and joining the substrate segments together, and then forming electrical connections to each hot mirror structure.

A switchable hot mirror array may have any suitable number of mirrors, and any suitable size. In some examples, a switchable hot mirror array may be 1-2 mm thick, and may comprise 5-15 mirrors to image an eye box of approximately 40 mm width and 30 mm in height. In other examples, any other suitable switchable mirror array may be configured to image any other suitable size of eye box.

As mentioned above, in other examples, a switchable hot mirror array may be arranged in free space, with an air gap between each switchable mirror. In such an example, the switchable hot mirrors may be supported by support structures arranged on either side of each switchable hot mirror (e.g. on opposite sides of, or top and bottom of, an eyeglass-like frame structure).

Figure 6:
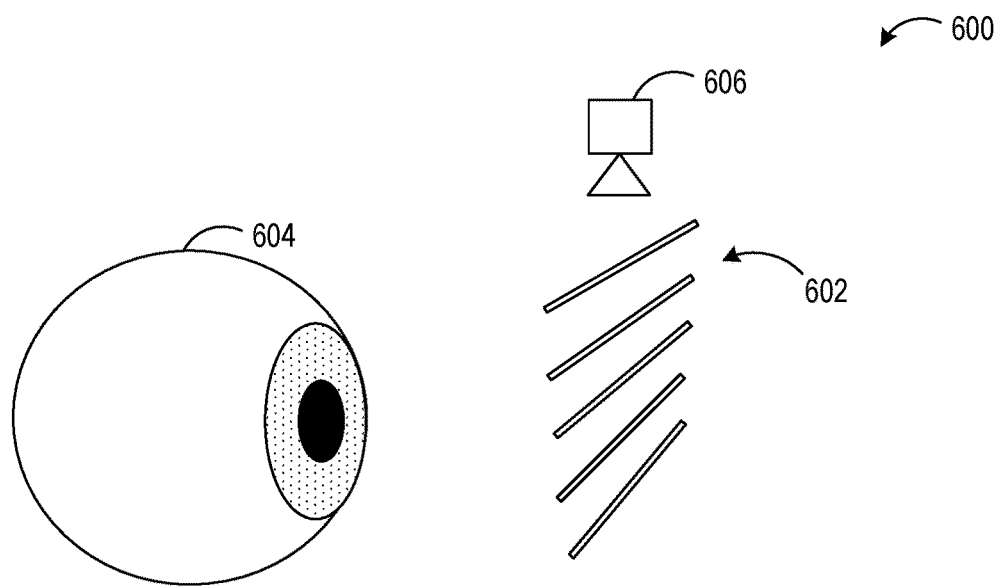
FIG. 6 shows an example eye-imaging system comprising hot mirrors arranged at varying angles.

In the above examples, the switchable hot mirrors are shown as being generally parallel to one another. FIG. 6 shows an example eye-imaging system 600 in which switchable hot mirrors of a switchable hot mirror array 602 have progressively different angles. In one such example, each switchable hot mirror may be configured to direct light to an eye-imaging camera 606 comprising a line scan camera or other camera that is configured to image a subset of rows or columns of pixels of an image at a time. Thus, the image portion reflected by each switchable hot mirror spatially overlaps with other image portions at the image sensor, but is reflected to eye-imaging camera 606 during a different time period.

Figure 7:
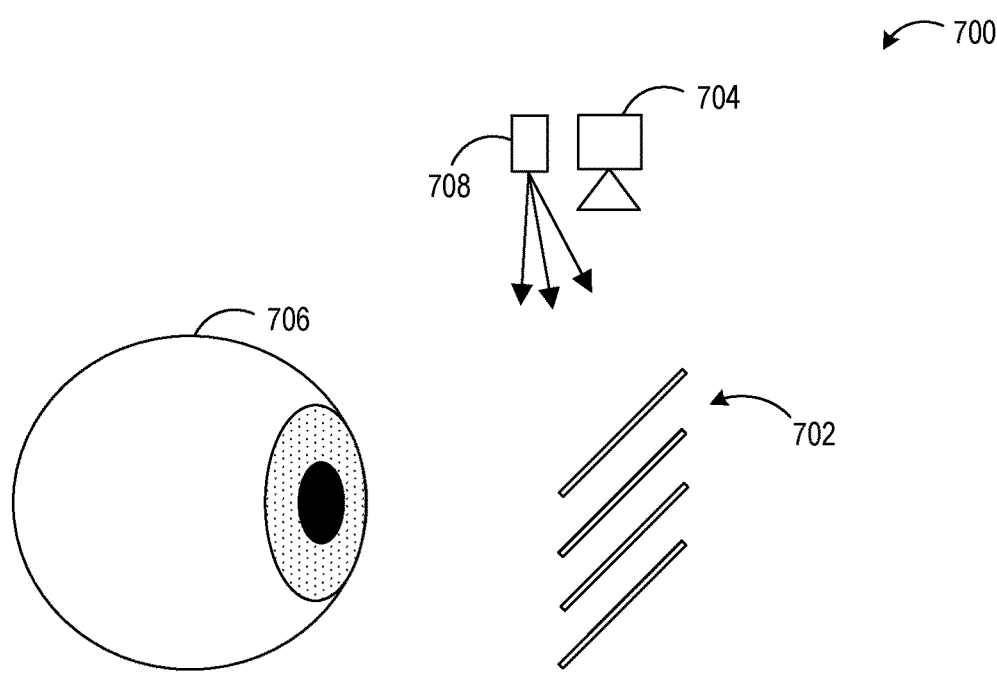
FIG. 7 shows an example eye-imaging system comprising switchable hot mirrors configured to direct illumination light toward an eye.

As mentioned above, in some examples, flood illumination may be used alternatively to or in addition to glint sources to illuminate an eye for eye imaging. For example, flood illumination may be utilized for bright pupil tracking. In such examples, a switchable hot mirror array may be used for eye illumination as well as directing light from the eye toward the eye-imaging camera. FIG. 7 shows an example eye-imaging system 700 including a switchable hot mirror array 702 comprising an eye-imaging camera 704 imaging an eye 706. Eye 706 is illuminated by flood light source 708. Light source 708 may be located close to, or be co-axial with, eye-imaging camera 704, and therefore may utilize switchable hot mirror array 702 to direct illumination light toward the eye.

Figure 8:
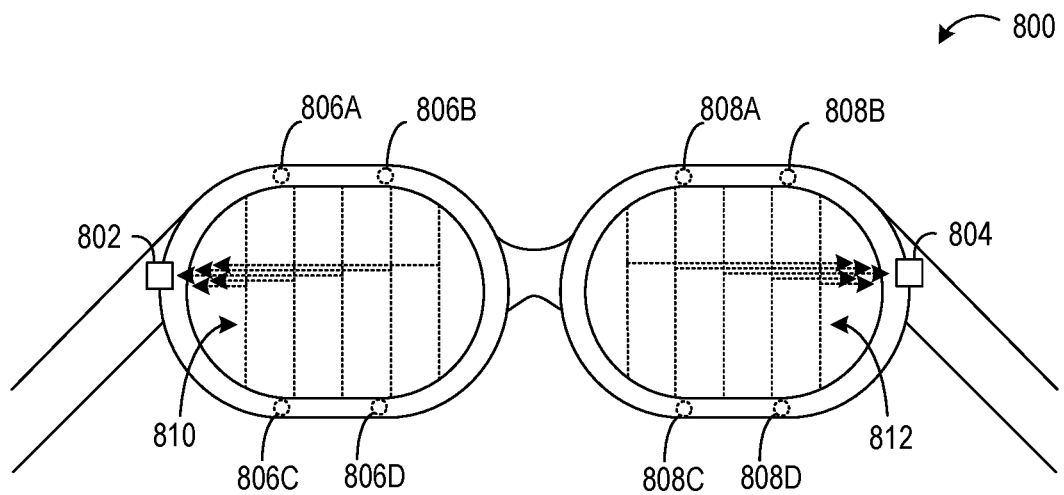
FIG. 8 shows an example head-mounted display device that includes left and right-side eye tracking sensors respectively arranged on left and right-side portions of a device frame.

In some examples, a head-mounted device may comprise an eye-imaging system for each eye of a user. FIG. 8 shows an example head-mounted display device 800 in the form of eyeglasses that includes a left eye-imaging camera 802 and a right eye-imaging camera 804. Left eye-imaging camera 802 and right eye-imaging camera 804 are respectively located at left and right-side portions of a frame of head-mounted display device 800. Head-mounted display device 800 includes a plurality of glint light sources 806A-D for eye-imaging camera 802 and a plurality of glint light sources 808A-D for eye-imaging camera 804. Head-mounted display device further comprises a left-eye switchable hot mirror array 810 and a right-eye switchable hot mirror array 812. As indicated schematically by arrows, left-eye switchable hot mirror array 810 is configured to controllably direct infrared light reflecting from a user's eye toward left eye-imaging camera 802. Likewise, right-eye switchable hot mirror array 812 is configured to controllably direct infrared light reflecting from a user's eye toward left eye-imaging camera 804.

Figure 9:
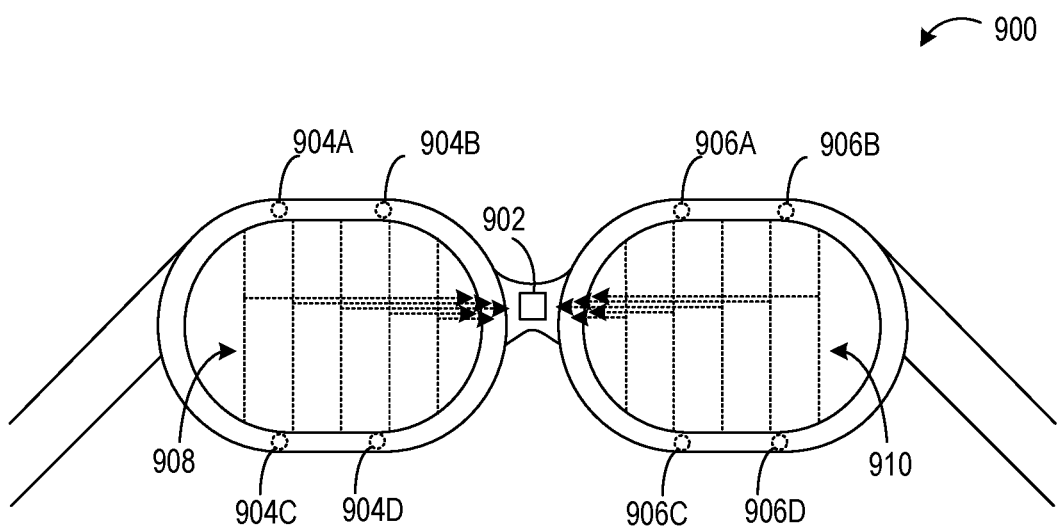
FIG. 9 shows an example head-mounted display device that includes an eye tracking eye-imaging camera arranged on a nose bridge portion of a frame.

In other examples, a same eye-imaging camera may be used for imaging both eyes. FIG. 9 shows an example head-mounted display device 900 that includes an eye-imaging camera 902 for imaging both eyes. Eye-imaging camera 902 is positioned at on a nose bridge portion of a frame of head-mounted display device 900. A first plurality of glint light sources 904A-D are utilized for one eye, and a second a plurality of glint light sources 906A-D are utilized for the other eye. Head-mounted display device 900 further comprises a left-eye switchable hot mirror array 908, and a right-eye switchable hot-mirror array 910. Left-eye switchable hot mirror array 908 and right-eye switchable hot mirror array 910 each is configured to direct light toward the nose bridge portion of head-mounted display device 900. Further, a prism or waveguide may be located in the nose bridge portion of head-mounted display device 900 to redirect the light from each switchable hot mirror array 908, 910 toward eye-imaging camera 902. In some examples, left-eye switchable hot mirror array 908 and right-eye switchable hot mirror array 910 may operate in a time-multiplexed manner to allow each eye to be imaged separately. In other examples, the prism or waveguide located in the nose bridge portion may direct light from left-eye switchable hot mirror array 908 and right-eye switchable hot mirror array 910 onto different portions of an image sensor of eye-imaging camera 902. In yet other examples, light from left-eye switchable hot mirror array 908 and right-eye switchable hot mirror array 910 may overlap temporally and spatially on an image sensor of eye-imaging camera 902. In such examples, a machine learning function (e.g. a suitable neural network, such as a convolutional neural network) may be trained to classify gaze directions for each eye based upon the overlapping image data. In other examples, a camera may be located at any other suitable position on the frame to image both eyes.

Figure 10:
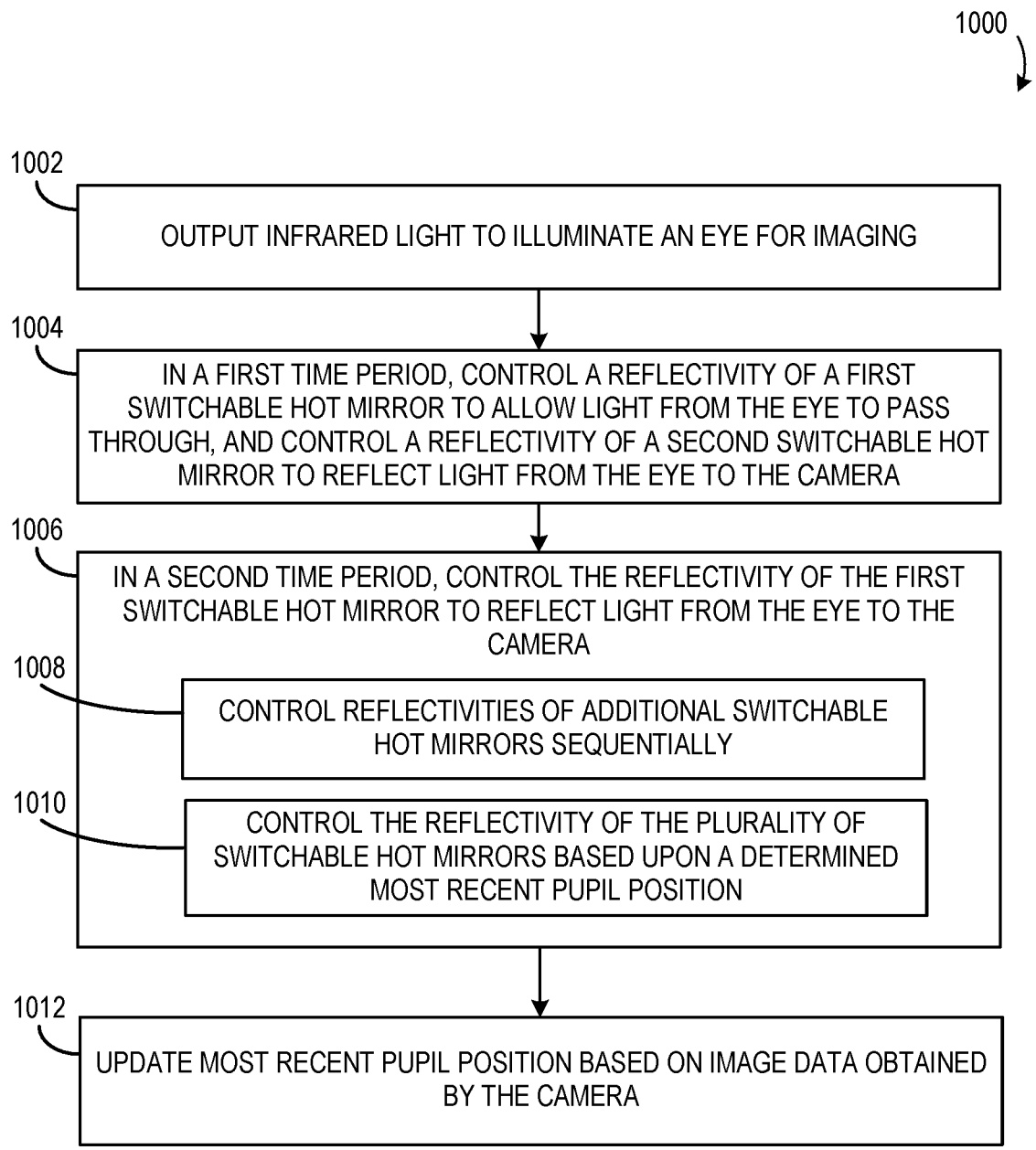
FIG. 10 shows a flow diagram depicting an example method of imaging an eye.

FIG. 10 shows an example method 1000 of operating an eye-imaging system comprising an eye-imaging camera and an array of switchable hot mirrors each configured to switchably direct infrared light reflecting from an eye to the eye-imaging camera. Method 1000 includes, at 1002, outputting infrared light to illuminate an eye for imaging. The infrared light may comprise infrared light from one or more glint sources, and/or light from a flood light source. As described above, each switchable hot mirror may be individually controllable to either reflect or pass the infrared light. As such, method 1000 includes, at 1004, in a first time period, controlling a reflectivity of a first switchable hot mirror to allow light from the eye to pass through, and control reflectivity of a second switchable hot mirror to reflect light from the eye to the eye-imaging camera. Then, method 1000 includes, at 1006, in a second time period, controlling the reflectivity of the first switchable hot mirror to reflect light from the eye to the eye-imaging camera. In some examples, the second switchable hot mirror may be allowed to relax, and in other examples, the second switchable hot mirror may be actively driven off. Further, as indicated at 1008, method 1000 may comprise controlling reflectivities of additional switchable mirrors in any suitable sequence. For example, the reflectivities may be controlled from bottom to top, top to bottom, outside to inside, inside to outside, or in other suitable sequence based at least upon a location of an eye-imaging camera. In some examples, method 1000 comprises, at 1010, controlling the reflectivity of each of one or more of the plurality of switchable hot mirrors based upon a determined most recent pupil position. For example, a subset of switchable hot mirrors that is currently imaging the pupil may be switched on. This may help to conserve power. Continuing, method 1000 further includes, at 1012, updating a most recent pupil position based on image data obtained by the eye-imaging camera.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
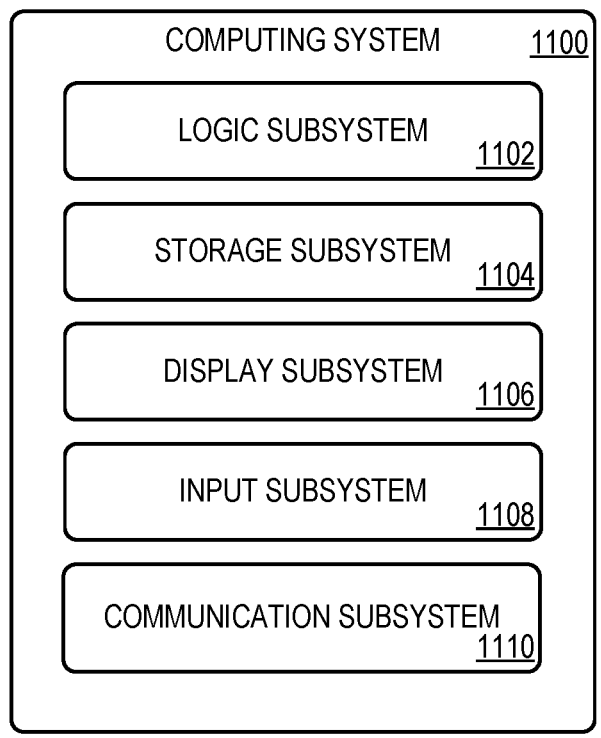
FIG. 11 shows a block diagram of an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices. Head-mounted display device 102, remote computing system(s) 206, controller 414, and controller 524 are examples of computing system 1100.

Computing system 1100 includes a logic subsystem 1102 and a storage subsystem 1104. Computing system 1100 may optionally include a display subsystem 1106, input subsystem 1108, communication subsystem 1110, and/or other components not shown in FIG. 11.

Logic subsystem 1102 includes one or more physical devices configured to execute instructions. For example, logic subsystem 1102 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 1102 may include one or more processors configured to execute software instructions. Additionally or alternatively, logic subsystem 1102 may include one or more hardware or firmware logic machines configured to execute hardware or firmware instructions. Processors of logic subsystem 1102 may be single-core or multi-core, and the instructions executed thereon may be configured for sequential, parallel, and/or distributed processing. Individual components of logic subsystem 1102 optionally may be distributed among two or more separate devices, which may be remotely located and/or configured for coordinated processing. Aspects of logic subsystem 1102 may be virtualized and executed by remotely accessible, networked computing devices configured in a cloud-computing configuration.

Storage subsystem 1104 includes one or more physical devices configured to hold instructions executable by logic subsystem 1102 to implement the methods and processes described herein. When such methods and processes are implemented, the state of storage subsystem 1104 may be transformed—e.g., to hold different data.

Storage subsystem 1104 may include removable and/or built-in devices. Storage subsystem 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1104 may include volatile, nonvolatile, dynamic, static, read/write, read-only, random-access, sequential-access, location-addressable, file-addressable, and/or content-addressable devices.

It will be appreciated that storage subsystem 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1102 and storage subsystem 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1106 may be used to present a visual representation of data held by storage subsystem 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic subsystem 1102 and/or storage subsystem 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

Another example provides a head-mounted display system, comprising a frame, an eye-imaging camera supported on the frame, a switchable hot mirror array comprising a plurality of switchable hot mirrors configured to direct light reflecting from an eye toward the eye-imaging camera, and a controller configured to control switching of a reflectivity of each of the plurality of switchable hot mirrors. In this example, two or more switchable hot mirrors of the plurality of switchable hot mirrors may additionally or alternatively be oriented at different angles to the eye-imaging camera. The eye-imaging camera may additionally or alternatively be located at a side portion of a frame. The eye-imaging camera may additionally or alternatively be located at an upper portion of the frame. The switchable hot mirror array may additionally or alternatively be positioned within a visibly transparent support. The eye-imaging camera may additionally or alternatively include a line camera. The head-mounted display system may additionally or alternatively include an infrared light emitter configured to direct infrared light toward the plurality of switchable hot mirrors. The switchable hot mirror array may additionally or alternatively include an array of switchable Bragg gratings. The switchable hot mirror array may additionally or alternatively include a polarization-selective mirror. The controller may additionally or alternatively be configured to determine a most recent pupil position based on image data obtained by the eye-imaging camera, and control the reflectivity of one or more of the plurality of switchable hot mirrors based upon the most recent pupil position. One or more switchable hot mirrors of the plurality of switchable hot mirrors may additionally or alternatively include optical power.

Another example provides, on a computing system, a method of operating an eye-imaging system, the eye-imaging system comprising an eye-imaging camera and a plurality of switchable hot mirrors each configured to direct light reflecting from an eye to the eye-imaging camera, the method comprising, in a first time period, controlling a reflectivity of a first switchable hot mirror to allow light from the eye to pass through and controlling a reflectivity of a second switchable hot mirror to reflect light from the eye to the eye-imaging camera, and in a second time period, controlling the reflectivity of the first switchable hot mirror to reflect light from the eye to the eye-imaging camera. The plurality of switchable mirrors may additionally or alternatively include one or more additional switchable hot mirrors, and further comprising controlling the reflectivities of the plurality of switchable hot mirrors sequentially. The method may additionally or alternatively include outputting infrared light toward the plurality of switchable hot mirrors to illuminate an eye for imaging. The method may additionally or alternatively include determining a most recent pupil position based on image data obtained by the eye-imaging camera, and controlling reflectivity of one or more of the plurality of switchable hot mirrors based upon the most recent pupil position.

Another example provides a head-mounted display system, comprising a frame, an eye-imaging camera supported on a side portion of the frame, a switchable hot mirror array comprising a visibly transparent support, and a plurality of switchable hot mirrors positioned within the visibly transparent support, each switchable hot mirror configured to direct light reflecting from an eye toward the eye-imaging camera, and a controller configured to control switching of a reflectivity of each of the plurality of switchable hot mirrors. The controller may additionally or alternatively be configured to control reflectivity of the plurality of switchable hot mirrors sequentially. The eye-imaging camera may additionally or alternatively include a line camera. The head-mounted display system may additionally or alternatively include an infrared light emitter configured to direct infrared light toward the plurality of switchable hot mirrors. Two or more switchable hot mirrors of the plurality of switchable hot mirrors may additionally or alternatively be oriented at different angles to the eye-imaging camera.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display system, comprising:
a frame;
an eye-imaging camera supported on the frame;
a switchable hot mirror array comprising a plurality of switchable hot mirrors configured to direct light reflecting from an eye toward the eye-imaging camera; and
a controller configured to control switching of a reflectivity of each of the plurality of switchable hot mirrors, wherein the plurality of switchable hot mirrors is arranged such that, when reflectivity of a first switchable hot mirror is switched on and reflectivity of a second switchable hot mirror is off, light incident on the first switchable hot mirror is reflected toward the eye-imaging camera, passing through the second switchable hot mirror.

2. The head-mounted display system of claim 1, wherein two or more switchable hot mirrors of the plurality of switchable hot mirrors are oriented at different angles to the eye-imaging camera.

3. The head-mounted display system of claim 1, wherein the eye-imaging camera is located at a side portion of a frame.

4. The head-mounted display system of claim 1, wherein the eye-imaging camera is located at an upper portion of the frame.

5. The head-mounted display system of claim 1, wherein the switchable hot mirror array is positioned within a visibly transparent support.

6. The head-mounted display system of claim 1, wherein the eye-imaging camera comprises a line camera.

7. The head-mounted display system of claim 1, further comprising an infrared light emitter configured to direct infrared light toward the plurality of switchable hot mirrors.

8. The head-mounted display system of claim 1, wherein the switchable hot mirror array comprises an array of switchable Bragg gratings.

9. The head-mounted display system of claim 1, wherein the switchable hot mirror array comprises a polarization-selective mirror.

10. The head-mounted display system of claim 1, wherein the controller is configured to determine a most recent pupil position based on image data obtained by the eye-imaging camera, and control the reflectivity of one or more of the plurality of switchable hot mirrors based upon the most recent pupil position.

11. The head-mounted display system of claim 1, wherein one or more switchable hot mirrors of the plurality of switchable hot mirrors comprises optical power.

12. On a computing system, a method of operating an eye-imaging system, the eye-imaging system comprising an eye-imaging camera and a plurality of switchable hot mirrors each configured to direct light reflecting from an eye to the eye-imaging camera, the method comprising
in a first time period, controlling a reflectivity of a first switchable hot mirror to allow light from the eye to pass through and controlling a reflectivity of a second switchable hot mirror to reflect light from the eye toward the eye-imaging camera, passing through the first switchable hot mirror; and
in a second time period, controlling the reflectivity of the first switchable hot mirror to reflect light from the eye toward the eye-imaging camera.

13. The method of claim 12, wherein the plurality of switchable mirrors further comprises one or more additional switchable hot mirrors, and further comprising controlling the reflectivities of the plurality of switchable hot mirrors sequentially.

14. The method of claim 12, further comprising outputting infrared light toward the plurality of switchable hot mirrors to illuminate an eye for imaging.

15. The method of claim 12, further comprising determining a most recent pupil position based on image data obtained by the eye-imaging camera, and controlling reflectivity of one or more of the plurality of switchable hot mirrors based upon the most recent pupil position.

16. A head-mounted display system, comprising:
a frame;
an eye-imaging camera supported on a side portion of the frame;

a switchable hot mirror array comprising a visibly transparent support, and a plurality of switchable hot mirrors positioned within the visibly transparent support, each switchable hot mirror configured to direct light reflecting from an eye toward the eye-imaging camera; and a controller configured to control switching of a reflectivity of each of the plurality of switchable hot mirrors, wherein the plurality of switchable hot mirrors is arranged such that, when reflectivity of a first switchable hot mirror is switched on and reflectivity of a second switchable hot mirror is off, light incident on the first switchable hot mirror is reflected toward the eye-imaging camera, passing through the second switchable hot mirror.

17. The head-mounted display system of claim 16, wherein the controller is configured to control reflectivity of the plurality of switchable hot mirrors sequentially.

18. The head-mounted display system of claim 16, wherein the eye-imaging camera comprises a line camera.

19. The head-mounted display system of claim 16, further comprising an infrared light emitter configured to direct infrared light toward the plurality of switchable hot mirrors.

20. The head-mounted display system of claim 16, wherein two or more switchable hot mirrors of the plurality of switchable hot mirrors are oriented at different angles to the eye-imaging camera.

* * * * *